United States Patent
Golden et al.

[11] Patent Number: 6,106,593
[45] Date of Patent: Aug. 22, 2000

[54] PURIFICATION OF AIR

[75] Inventors: Timothy Christopher Golden, Allentown; Fred William Taylor, Coplay; Leighta Maureen Johnson, Allentown, all of Pa.; Nasim Hassan Malik, London; Christopher James Raiswell, Crewe, both of United Kingdom

[73] Assignee: Air Products and Chemicals, Inc., Allentown, Pa.

[21] Appl. No.: 09/168,505

[22] Filed: Oct. 8, 1998

[51] Int. Cl.[7] .......................... B01D 53/04; B01D 53/26
[52] U.S. Cl. .................... 95/120; 95/126; 95/129; 95/139; 95/144; 96/130; 96/132; 96/143
[58] Field of Search .................... 95/96–98, 100–105, 95/117–123, 129, 139, 144, 145; 96/130–133, 144, 146

[56] References Cited

U.S. PATENT DOCUMENTS

| | | | |
|---|---|---|---|
| 3,674,429 | 7/1972 | Collins | 95/122 X |
| 3,957,463 | 5/1976 | Drissel et al. | 95/121 X |
| 4,156,598 | 5/1979 | Woytek et al. | 95/117 X |
| 4,507,271 | 3/1985 | Van Deyck et al. | 423/387 |
| 4,541,851 | 9/1985 | Bosquain et al. | 55/208 |
| 4,554,141 | 11/1985 | Scull et al. | 95/144 |
| 4,711,645 | 12/1987 | Kumar | 95/122 X |
| 4,933,158 | 6/1990 | Aritsuka et al. | 423/210 |
| 5,137,548 | 8/1992 | Grenier et al. | 55/23 |
| 5,156,657 | 10/1992 | Jain et al. | 95/122 X |
| 5,169,413 | 12/1992 | Leavitt | 95/121 X |
| 5,232,474 | 8/1993 | Jain | 55/26 |
| 5,451,248 | 9/1995 | Sadkowski et al. | 95/120 X |
| 5,571,309 | 11/1996 | Kumar | 95/139 X |
| 5,624,477 | 4/1997 | Armond | 95/117 X |
| 5,656,064 | 8/1997 | Golden et al. | 95/96 |
| 5,674,311 | 10/1997 | Notaro et al. | 95/122 X |
| 5,728,198 | 3/1998 | Acharya et al. | 95/123 X |
| 5,779,767 | 7/1998 | Golden et al. | 95/139 X |
| 5,846,295 | 12/1998 | Kalbassi et al. | 95/120 X |
| 5,906,675 | 5/1999 | Jain et al. | 95/120 X |
| 5,914,455 | 6/1999 | Jain et al. | 95/119 X |
| 5,919,286 | 7/1999 | Golden et al. | 95/122 X |

FOREIGN PATENT DOCUMENTS

| | | | |
|---|---|---|---|
| 0284850 | 9/1988 | European Pat. Off. | |
| 1068150 | 1/1984 | U.S.S.R. | 95/119 |

OTHER PUBLICATIONS

Wenning ('Nitrous oxides in Air Separation Plants' U. Wenning, Proceedings from MUST 1996, pp. 79–89).

*Primary Examiner*—Robert H. Spitzer
*Attorney, Agent, or Firm*—Geoffrey L. Chase

[57] ABSTRACT

Carbon dioxide, water, nitrous oxide and optionally ethylene are removed from a feed air stream by a temperature swing adsorption using a first adsorbent such as alumina to adsorb water, a second adsorbent such as 13X zeolite to adsorb carbon dioxide, and a third adsorbent such as binderless calcium exchanged X zeolite to adsorb nitrous oxide and optionally ethylene, prior to cryogenic separation of the purified air stream.

12 Claims, 3 Drawing Sheets

PURIFICATION OF AIR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to the removal of water, carbon dioxide and nitrous oxide from an air stream prior to cryogenic air separation.

The cryogenic separation of air requires a pre-purification step for the removal of both high boiling and hazardous materials. Principal high boiling air components include both water and carbon dioxide. If removal of these impurities from ambient feed air is not achieved, then water and carbon dioxide will freeze out in cold sections of the separation process such as heat exchangers and the LOX sump. This will cause pressure drop, flow variations and operational problems. Various hazardous materials have also to be removed including acetylene and other hydrocarbons. The high boiling hydrocarbons are a problem because they will concentrate in the LOX section of the column, resulting in a potential explosive hazard.

It is known that oxides of nitrogen should be removed also. A minor air component is nitrous oxide $N_2O$, which is present in ambient air at about 0.3 ppm. It has similar physical properties to carbon dioxide and therefore presents a potential operation problem because of solids formation in the column and heat exchangers of the cryogenic distillation apparatus. In addition, nitrous oxide is known to enhance combustion of organic materials and is shock sensitive. As such nitrous oxide also presents a safety hazard. Ethylene is a further impurity in air which is desirably removed prior to cryogenic air separation.

The pre-purification of air is usually conducted by adsorptive clean up processes. These may operate by thermal swing adsorption (TSA) as described in U.S. Pat. Nos. 4,541,851 and 5,137,548 or by pressure swing adsorption (PSA) as described in U.S. Pat. No. 5,232,474.

Wenning ('Nitrous oxides in Air Separation Plants' U. Wenning, Proceedings from MUST 96, pp 79–89) describes how carbon dioxide can displace already adsorbed nitrous oxide from a zeolite adsorbent, causing breakthrough of nitrous oxide at a concentration greater than that in ambient air.

No solution to the problem is offered, but Wenning indicates that there may be a need for a search for a more suitable adsorption material for nitrous oxide in the future.

U.S. Pat. No. 4,933,158 suggests that various natural zeolites may be superior to synthetic zeolites for adsorbing nitrous oxide, carbon dioxide and $N_2F_2$ from $NF_3$.

EP-A-0284850 discloses the use of multivalent cation exchanged zeolites for removing water and carbon dioxide from air prior to air separation. It is remarked that other impurities including nitrogen oxides and olefins can be removed also, although no data are presented. In the preferred practice of the invention, the multivalent cation is barium or strontium, and in particular has an ionic radius greater than $Ca^{2+}$. However, it is indicated that although not preferred, calcium may be used. The zeolite itself may be 13X. The benefit obtained from the use of the multivalent cation exchanged zeolite is that water can be removed during regeneration at a low temperature. Accordingly, it will be essential that the multivalent cation exchanged zeolite is used for water adsorption.

A further stated advantage of using the multivalent cation exchanged zeolites is that they are said to be able to adsorb more carbon dioxide. Plainly, therefore, the cation exchanged zeolite will need to be used for carbon dioxide adsorption as well as water adsorption. The extent to which a Ca exchanged 13X zeolite would adsorb nitrous oxide in particular is not disclosed.

BRIEF SUMMARY OF THE INVENTION

The selectivity for nitrous oxide as against carbon dioxide exhibited by an adsorbent may be expressed as the ratio of the Henry's Law constants (initial isotherm slopes) for the two gases at 30° C. For 13X zeolite, we find this ratio to be about 0.39.

We have now found that certain adsorbents have substantially greater selectivity for nitrous oxide over carbon dioxide.

The present invention now provides a process for removing water, carbon dioxide and nitrous oxide and optionally also ethylene from a feed air stream prior to cryogenic distillation of the air stream to separate a nitrogen rich stream and/or an oxygen rich stream, comprising passing said feed air stream containing water, carbon dioxide and nitrous oxide through a first adsorbent to adsorb said water, through a second adsorbent to remove carbon dioxide and through a third adsorbent to remove said nitrous oxide and optionally said ethylene from said air stream.

The adsorbent for removing water (the first adsorbent) and the adsorbent for removing carbon dioxide (the second adsorbent) can be the same material and may be upstream and downstream portions of a single bed of adsorbent. The third adsorbent for removing nitrous oxide and optionally ethylene is however required to be different in nature from the first and second adsorbents.

Said three adsorbents are preferably regenerated by TSA. Periodic regeneration preferably takes place while a second set of the three adsorbents is used to continue the purification process, each set of the three adsorbents being on-line in the purification process and being regenerated in alternation.

The first adsorbent for water removal preferably comprises standard desiccants including activated alumina, impregnated alumina, silica gel or A or X type zeolites.

Said second adsorbent preferably comprises impregnated alumina, impregnated composite alumina/zeolite, or A or X type zeolites, especially 13X (NaX) zeolite.

The impregnated alumina may be as described in U.S. Pat. No. 5,656,064 in which $CO_2$ removal capacity is increased by impregnation of a starting alumina with a basic solution having a pH of at least 9, e.g. a solution of $KHCO_3$, and drying at a temperature which is low enough (e.g. below 200° C.) to avoid decomposing the impregnant compound to a form which adsorbs $CO_2$ in such a manner that the compound does not regenerate under the intended regeneration conditions.

Preferably, the pH of the impregnating solution is related to the zero point charge (ZPC) of the alumina according to the formula:

$$pH \geq ZPC - 1.4$$

or more preferably $ZPC+2 \geq pH \geq ZPC-1.4$.

The impregnant is preferably an alkali metal or ammonium hydroxide, carbonate, bicarbonate, phosphate or organic acid salt.

Said third adsorbent preferably has a Henry's Law selectivity for nitrous oxide compared to carbon dioxide of 0.5 or more at 30° C., more preferably said selectivity is at least 0.9.

Furthermore, the Henry's Law constant for nitrous oxide adsorption of the third adsorbent is preferably at least 79 mmole/g/atm, more preferably at least 500 mmole/g/atm, and still more preferably at least 1000 mmole/g/atm.

Said third adsorbent is preferably calcium exchanged X zeolite. Most preferably, the third adsorbent is a binderless calcium exchanged X zeolite.

Typically, the third adsorbent will be such that adsorption of water thereon would be disadvantageous in a TSA air purification process. Calcium exchanged X adsorbents are very sensitive to water exposure. Even after high temperature regeneration following water exposure, calcium exchanged X adsorbents show reduced capacity for gas molecules like carbon dioxide or nitrous oxide. Therefore, the second adsorbent is a material with less water sensitivity than calcium exchanged X type zeolite.

We have measured the Henry's Law constants for nitrous oxide and carbon dioxide of a number of adsorbents. Table 1 below shows these and the Henry's Law selectivity (ratio of Henry's Law constants).

TABLE 1

| Adsorbent | (mmole/g/atm) $K_H CO_2$ | (mmole/g/atm) $K_H N_2O$ | S $N_2OCO_2$ |
|---|---|---|---|
| Alcan AA-300 alumina | 5.6 | 0.45 | 0.08 |
| UOP 13X | 162 | 63 | 0.39 |
| UOP 5A | 145 | 54 | 0.37 |
| Binderless CaX | 1031 | 1035 | 1.00 |
| Na-mordenite | 366 | 185 | 0.51 |
| Ca-mordenite | 374 | 113 | 0.30 |
| CaX | 1020 | 503 | 0.49 |
| BaX | 155 | 79 | 0.51 |

It can be seen that CaX, BaX, Na-mordenite and binderless CaX satisfy the requirements given above but that calcium exchange does not always improve performance. Ca exchanged mordenite is less suitable than Na-mordenite. It can also be seen that all the materials noted above have higher nitrous oxide/carbon dioxide selectivities and higher nitrous oxide Henry's Law constants than 13X and 5A, the conventional materials for TSA pre-purification of air.

Preferably there is present no more than 150% of the amount of the third adsorbent needed to adsorb the nitrous oxide content of the air stream up to the point where the second adsorbent's capacity for carbon dioxide adsorption is used up.

The invention includes a process for air separation comprising removing water, carbon dioxide, nitrous oxide and optional ethylene from a feed air stream by passing said feed air stream containing water, carbon dioxide, ethylene if present and nitrous oxide through a first adsorbent to adsorb said water, through a second adsorbent to remove carbon dioxide and through a third adsorbent present in an amount sufficient to remove said nitrous oxide and optionally ethylene from said air stream and conducting cryogenic distillation of the purified air stream to separate a nitrogen rich stream and/or an oxygen rich stream.

The invention further includes apparatus for removing water, carbon dioxide, nitrous oxide and optionally ethylene from a feed air stream prior to cryogenic distillation of the air stream to separate a nitrogen rich stream and/or an oxygen rich stream, comprising in fluid series connection a first adsorbent to adsorb said water, a second adsorbent to remove carbon dioxide and a third adsorbent to remove said nitrous oxide and optionally ethylene from said air stream.

The invention includes also apparatus for air separation comprising a purification unit comprising in fluid series connection a first adsorbent to adsorb water, a second adsorbent to remove carbon dioxide and a third adsorbent to remove said nitrous oxide and optionally ethylene from said air stream and a cryogenic air separation unit for separating nitrogen from oxygen in said feed air stream after the removal of water, carbon dioxide and nitrous oxide in said purification unit.

Air feed temperatures may be from 5 to 40° C. with feed pressures of 2 to 15 atmospheres. Typical regeneration temperatures are 80 to 400° C. Regeneration gas can consist of $N_2$, $O_2$, $CH_4$, $H_2$, Ar, He, air and mixtures thereof. Suitable regeneration pressures are 0.1 to 20 bara. In a typical preferred embodiment, the regeneration flow would consist of either product $N_2$ or more desirably waste effluent from the $N_2$ plant (60% $O_2$/40% $N_2$).

BRIEF DESCRIPTION OF SEVERAL VIEWS OF THE DRAWINGS

The invention will be further illustrated by the following description of preferred embodiments with reference to the accompanying drawings, in which.

DETAILED DESCRIPTION OF THE INVENTION

Figure 1:
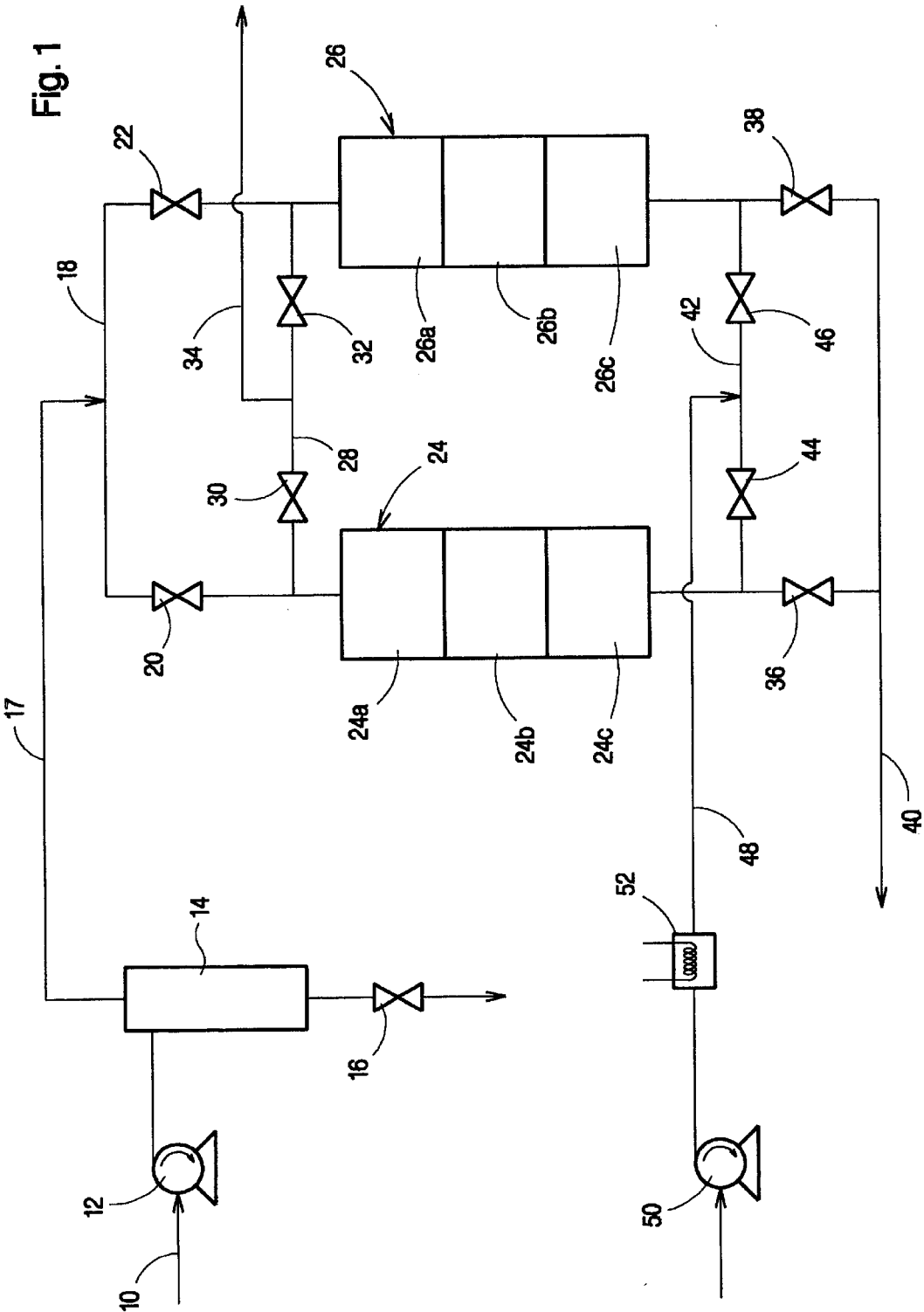
FIG. 1 is a schematic diagram of apparatus for use according to a first embodiment of the invention.

As shown in FIG. 1, apparatus for use according to the invention comprises an inlet 10 for an air stream leading to a main air compressor 12. Compressed air produced by the main air compressor 12 passes to a cooler 14 in which some of the water present in the air is condensed out and exists via drain valve 16.

The cooled, partially dried air passes via a line 17 to a purification section of the apparatus which in the illustrated case operates by TSA. It should be appreciated however that this section of the apparatus can be designed to operate by any of the variants of TSA known in the art.

Air is received from line 17 into an inlet manifold 18 containing valves 20, 22, which connect line 17 and manifold 18 to vessels 24, 26. Downstream of valves 20, 22, the manifold comprises a bridge line 28 containing valves 30, 32 by which the vessels 24, 26 may respectively be connected to a vent to waste line 34.

The downstream ends of the vessels 24, 26 are connected to an outlet manifold comprising valves 36, 38 by which the respective vessels are connected to a product outlet line 40. Upstream of the valves 36, 38, the manifold comprises a bridge line 42 containing valves 44, 46 by which the respective vessels can be connected to a purge gas supply line 48, which leads from a supply of purge gas via a compressor 50 and a heater 52 to connect to bridge line 42 between valves 44 and 46. The supply of purge gas may suitably be from nitrogen separated from air purified in the apparatus shown and then subjected to cryogenic distillation or from air purified in the illustrated apparatus before it is subjected to such distillation.

Within each of the vessels 24 and 26 in FIG. 1, there are three layers of adsorbent illustrated. The first two layers are conventional adsorbents for water 24a, 26a and carbon dioxide 24b, 26b. Suitably these are activated alumina and 13X zeolite respectively. However, any suitable adsorbent or adsorbents for water and carbon dioxide removal may be used as known in the art and these two layers may be combined into a single layer of adsorbent.

The third layer illustrated is of Ca exchanged X zeolite 24c, 26c.

When vessel 24 or 26 is on line, water is progressively adsorbed in the activated alumina first adsorbent. A water front will move progressively through the bed from the inlet toward the outlet end of the bed of adsorbent. The 13X zeolite acting as the second adsorbent acts as a guard against break through of water from the first adsorbent and acts also to adsorb carbon dioxide. Again, a carbon dioxide front will progressively move through the bed of second adsorbent. Nitrous oxide will initially adsorb onto the second adsorbent also, but will be continuously displaced through the bed of second adsorbent by the advancing front of adsorbed carbon dioxide. Eventually, the accumulated nitrous oxide content of the air which has so far passed through the vessel will be displaced from the second adsorbent and will enter the third adsorbent bed of Ca exchanged X zeolite where it will be adsorbed. At this point it will be time to regenerate the vessel in question and put the other vessel on line.

Thus the second adsorbent serves to guard the Ca exchanged X zeolite layer against water contamination, which would have a destructive effect as CaX is water sensitive.

The second adsorbent also relieves the CaX layer of the task of carbon dioxide adsorption, so that the CaX layer need be no larger than is needed to adsorb the nitrous oxide content of as much of the feed air as will use up the carbon dioxide adsorption capacity of the second adsorbent. Minimising the size of the CaX layer is desirable because the CaX exhibits a greater heat of adsorption for nitrogen than does 13X, which heat should not be passed to the downstream cryogenic air distillation process following repressurisation with nitrogen-rich gas. Thus, the temperature pulse leaving the bed at the start of the feed step is minimised by using only a small section of CaX zeolite. This allows the downstream cryogenic section to run more smoothly.

The three layer structure of the adsorbent used according to the invention therefore allows a previously unknown synergy between the adsorbents with the second layer serving to protect the third from water breaking through the first layer and to avoid carbon dioxide adsorption in the third layer passing excessive heat of adsorption downstream.

Figure 2:
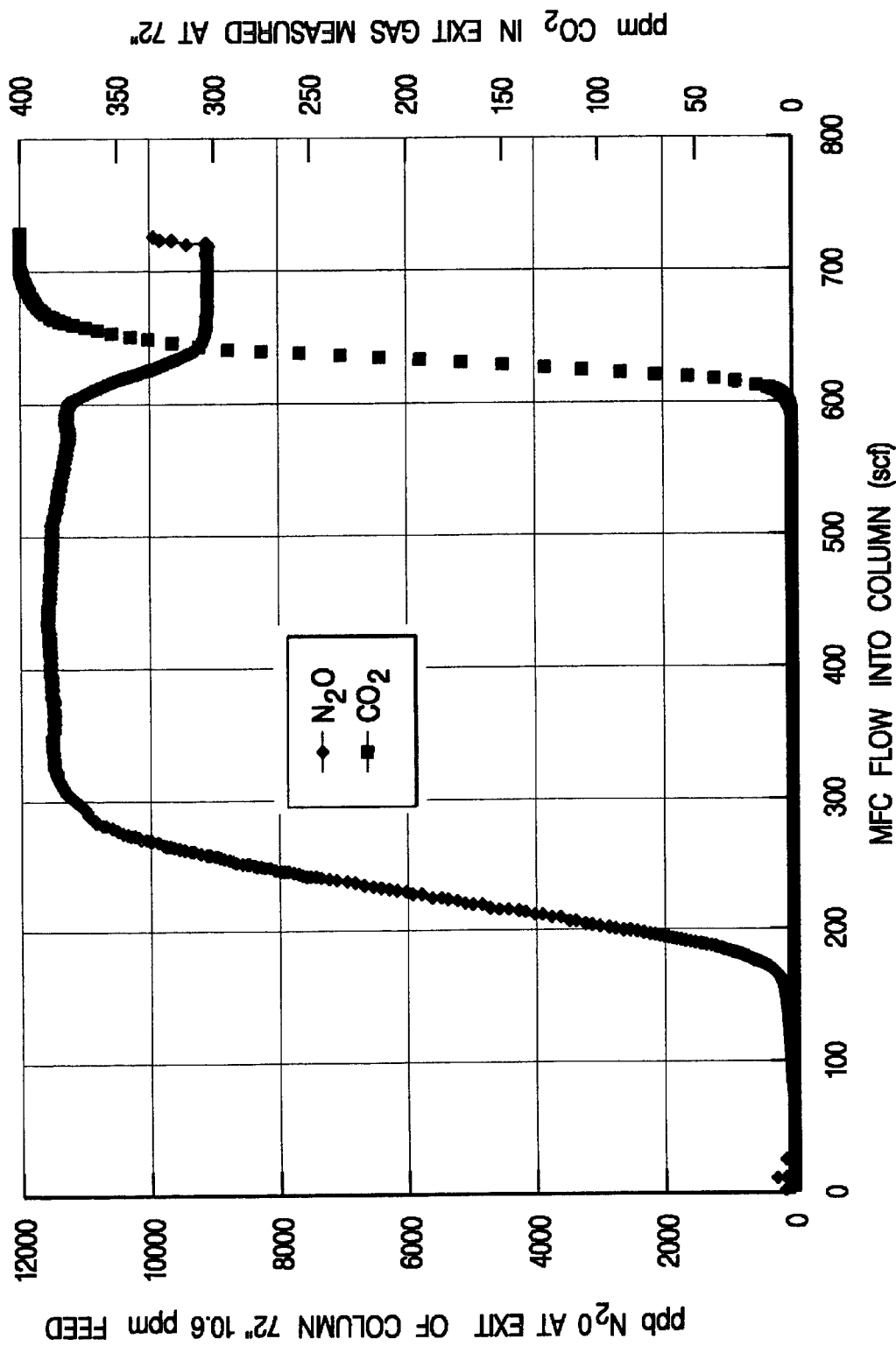
FIG. 2 shows a graph of $CO_2$ and $N_2O$ breakthrough from 13X zeolite.
Figure 3:
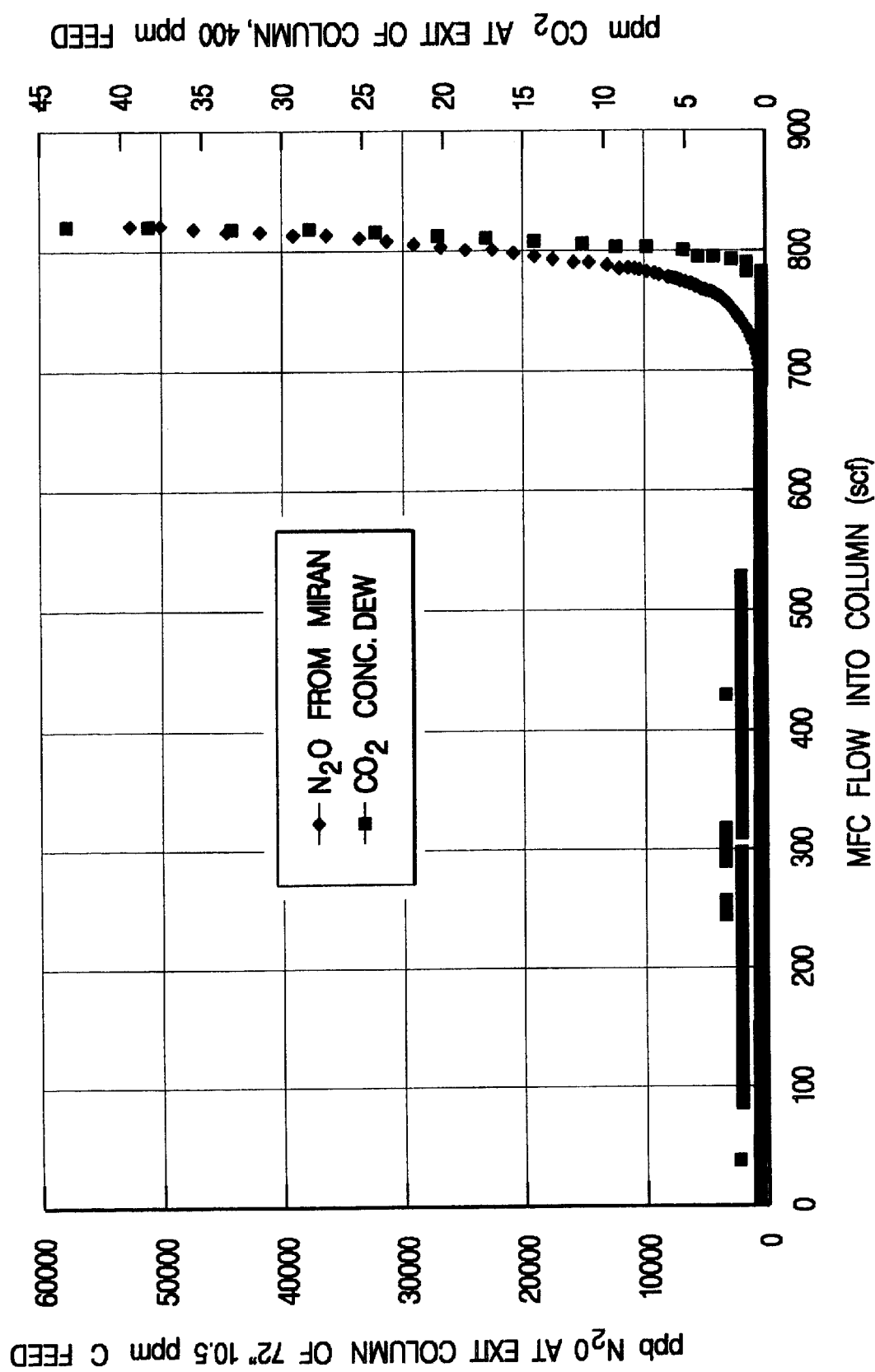
FIG. 3 shows a graph of $CO_2$ and $N_2O$ breakthrough from CaX zeolite.

FIG. 2 shows a breakthrough curve obtained with 13X zeolite at 25° C., 100 psig, with a feed gas of air with 400 ppm $CO_2$ and 10 ppm $N_2O$. The data were obtained in a 1 inch (2.54 cm) diameter column by 6 feet long (183 cm). Prior to the experiments, the zeolite was regenerated in flowing $N_2$ at 200° C. The results clearly show that $N_2O$ exhibits breakthrough well before $CO_2$. Since 13X is an industry standard for front end air pre-purification, it follows that if the pre-purification unit is run until $CO_2$ breakthrough, significant levels of $N_2O$ will break through the bed ending up in the cryogenic system concentrating in the liquid oxygen. This result is similar to that shown by the Wenning article, cited above. FIG. 3 shows the same experiment, but this time using binderless CaX zeolite as the adsorbent. Surprisingly, this time $N_2O$ and $CO_2$ breakthrough at virtually the same time.

Thus, in accordance with the invention, the adsorption of carbon dioxide can be continued in a second adsorbent layer of 13X up to the capacity of the layer. This will result in a pulse of nitrous oxide leaving the layer as shown in FIG. 2, followed by an essentially ambient level of nitrous oxide in the air leaving the second adsorbent. This will be adsorbed by the Ca X layer of the third adsorbent from which there will be no nitrous oxide breakthrough unless the process is continued to the extent that the third adsorbent not only begins to adsorb carbon dioxide (which would represent a departure from intended operating parameters) but continues to adsorb carbon dioxide until it too suffers carbon dioxide breakthrough.

EXAMPLE

The three layer bed concept of this invention was tested in a pilot unit about 6 inches (15 cm) in diameter by 4 feet (122 cm) long. The bed was filled with 1 foot (30 cm) of potassium carbonate impregnated alumina, followed by 2 feet (60 cm) of 13X zeolite and a final layer of 1 foot (30 cm) of binderless CaX. Feed air at 8.9 barA (61 kPa) feed pressure, 14° C. with 370 ppm $CO_2$, 1 ppm acetylene, 1 ppm ethylene and 290 ppb $N_2O$ was passed through the bed the $CO_2$ breakthrough concentration was 20 ppb. The identical experiment was conducted with a standard, 2 layer bed as per the prior art, with 1 foot (30 cm) of potassium impregnated alumina followed by 3 feet (90 cm) of 13X zeolite. The results of the two experiments are shown in Table 2.

TABLE 2

| Experiment | % acetylene removal | % ethylene removal | % nitrous oxide removal |
|---|---|---|---|
| Prior art, 2 Layer bed | 100% | 59% | 29% |
| Present invention, 3 layer bed | 100% | 100% | 93% |

The results in Table 2 clearly show that the present invention dramatically increases both ethylene and nitrous removal over the prior art approaches to this problem.

What is claimed is:

1. A process for removing water, carbon dioxide and nitrous oxide from a feed air stream prior to cryogenic distillation of the air stream to separate a nitrogen rich stream and/or an oxygen rich stream, comprising passing said feed air stream containing water, carbon dioxide and nitrous oxide through a first adsorbent to adsorb said water, through a second adsorbent which optionally may be the same as the first adsorbent to remove carbon dioxide and through a third adsorbent to remove said nitrous oxide from said air stream wherein said third adsorbent has a Henry's Law selectivity for nitrous oxide compared to carbon dioxide of 0.49 or more at 30° C.

2. A process as claimed in claim 1, wherein said three adsorbents are regenerated by TSA.

3. A process as claimed in claim 1, wherein the first adsorbent comprises activated alumina, impregnated alumina or silica gel.

4. A process as claimed in claim 1, wherein said second adsorbent comprises NaX, NaA, or CaA zeolite.

5. A process as claimed in claim 1, wherein said selectivity is at least 0.9.

6. A process as claimed in claim 1, wherein the Henry's Law constant for nitrous oxide adsorption of the third adsorbent is at least 79 mmole/g/atm.

7. A process as claimed in claim 1, wherein there is present no more than 150% of the amount of the third adsorbent needed to adsorb the nitrous oxide content of the air stream up to the point where the second adsorbent's capacity for carbon dioxide adsorption is used up.

8. A process as claimed in claim 1, wherein said feed air stream contains ethylene and said third adsorbent removes said ethylene.

9. A process for removing water, carbon dioxide and nitrous oxide from a feed air stream prior to cryogenic distillation of the air stream to separate a nitrogen rich stream and/or an oxygen rich stream, comprising passing said feed air stream containing water, carbon dioxide and nitrous oxide through a first adsorbent to adsorb said water, through a second adsorbent which optionally may be the same as the first adsorbent to remove carbon dioxide and through a third adsorbent to remove said nitrous oxide from said air stream, wherein said third adsorbent is calcium exchanged X zeolite, Na mordenite, Ba exchanged X zeolite, or binderless Ca exchanged X zeolite.

10. A process for air separation comprising removing water, carbon dioxide and nitrous oxide from a feed air stream by passing said feed air stream containing water, carbon dioxide and nitrous oxide through a first adsorbent to adsorb said water, through a second adsorbent which optionally may be the same as said first adsorbent to remove carbon dioxide and through a third adsorbent present to remove said nitrous oxide from said air stream and conducting cryogenic distillation of the purified air stream to separate a nitrogen rich stream and/or an oxygen rich stream, wherein said third adsorbent has a Henry's Law selectivity for nitrous oxide compared to carbon dioxide of 0.49 or more at 30° C.

11. Apparatus for removing water, carbon dioxide and nitrous oxide from a feed air stream prior to cryogenic distillation of said feed air stream to separate a nitrogen rich stream and/or an oxygen rich stream, comprising in fluid series connection a first adsorbent to adsorb said water, a second adsorbent to remove said carbon dioxide and a third adsorbent to remove said nitrous oxide from said feed air stream, wherein said third adsorbent has a Henry's Law selectivity for nitrous oxide compared to carbon dioxide of 0.49 or more at 30° C.

12. Apparatus for air separation comprising a purification unit comprising in fluid series connection a first adsorbent to adsorb water, a second adsorbent to remove carbon dioxide and a third adsorbent to remove nitrous oxide from a feed air stream, wherein said third adsorbent has a Henry's Law selectivity for nitrous oxide compared to carbon dioxide of 0.49 or more at 30° C., and a cryogenic air separation unit for separating nitrogen from oxygen in said feed air stream after the removal of said water, carbon dioxide and nitrous oxide in said purification unit.

* * * * *